March 22, 1938. K. RABE 2,112,113
DRAWING INSTRUMENT
Filed Jan. 31, 1935

Inventor:
Karl Rabe

Patented Mar. 22, 1938

2,112,113

UNITED STATES PATENT OFFICE 2,112,113

DRAWING INSTRUMENT

Karl Rabe, Stuttgart, Germany, assignor to Adolf Rosenberger, Paris, France

Application January 31, 1935, Serial No. 4,382
In Germany February 15, 1934

9 Claims. (Cl. 33—122)

REISSUED

This invention relates to improvements in drawing instruments and has for an object the provision of an instrument which may be used alternately as a drawing instrument and as a planimeter.

It has hitherto been necessary when measuring areas, such as are necessary, for example, for calculating the weight of constructional and machine parts, to remove the drawing, to place it on a horizontal support and, finally, to carry out the measurement of the area by means of a special measuring device. This procedure has been found very complicated and time consuming because such measurements of area are necessary while the constructional parts are being developed and, therefore, repeated fixing on and removing of the drawing and repeated application of the measuring device could not be avoided. The arrangement, according to the invention, will make it possible to carry out such measurements of area on any drawing-board, that is also on vertical or inclined drawing-boards by means of the drawing device. For this purpose the measuring device of a polarplanimeter is rotatably mounted on the guiding arms connected with the drawing head of the drawing instrument, so as to be brought into the operative position by means of a simple handle. Since the drawing head is guided exactly parallel, any desired point thereof, or of the setsquare connected therewith, can be chosen as the starting point for travelling round the boundary of the area. This has the advantage that all surfaces, even the largest which have to be measured, can be dealt with in one operation without removing the drawing or interrupting the drawing operation. The planimeter constant can be freely chosen by changing the location of the tracing point to appropriate positions upon one of the guiding links 2, 2', or upon some member carried thereby. In order to assure that the running wheel of the planimeter will not pass off the drawing surface the planimeter head may be mounted adjustably with respect to the guiding links 2, 2'.

A constructional example of the arrangement is illustrated in detail in the accompanying drawing, in which.

Figure 1:
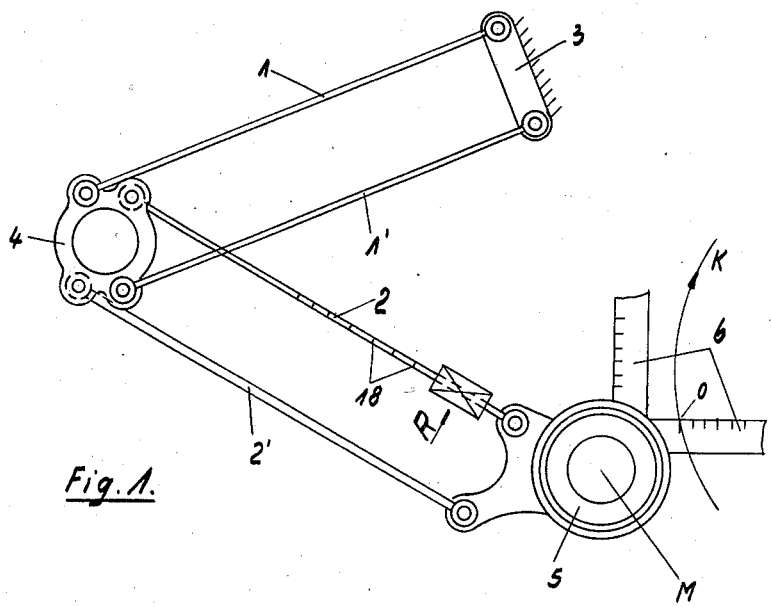
Figure 1 is an elevation of the parallelogram drawing instrument.
Figure 3:
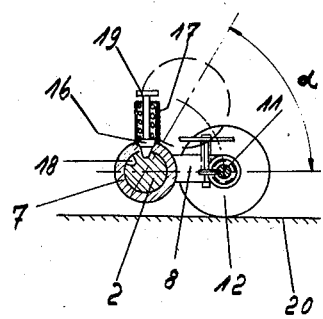
Figure 3 is a section through the measuring device on the line III—III of Figure 2.
Figure 2:
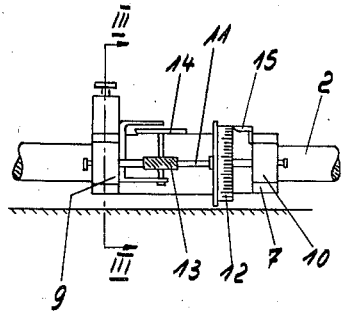
Figure 2 is an elevation of the measuring device seen in the direction R.

The parallelogram drawing device consists of two parallel guiding links or arms 1, 1' and 2, 2' arranged in series. The rotating links 1, 1' are each connected at one end to the block 3 and at the other end with an intermediate link such as the guiding ring 4 by means of suitable pivot means. The thrust arms 2, 2' are each hinged at one end to the intermediate member 4 and at the other end to a connecting link member such as the drawing head 5. The drawing head 5 carries a drawing instrument such as the setsquare 6 which is graduated and can preferably be adjusted about the middle point M of the drawing head 5. The measuring device of a polarplanimeter may be suitably mounted on the arm 2 by means of a sleeve 7. The sleeve 7 carries, by means of short arms 8, the bearing eyes 9, 10 for the measuring shaft 11. The running wheel 12 is connected with the measuring shaft 11 in a known manner and the counting disc 14 is connected through an angle drive 13. On the bearing 10 there is connected the vernier disc 15, the graduations of which are made the same as those of the running wheel 12. The sleeve 7 is rotatably and longitudinally displaceable on the arm 2 and can be fixed by means of a catch. The latter may consist of a conical pin 16 which is forced into the borings 18 of the arm 2 under the action of a previously tensioned spring 17. The pin 16 can be lifted against the spring pressure by means of a knob 19. In the operating position the wheel 12 rolls and slides on the drawing surface 20. The borings 18 are distributed at definite distances on the arm 2.

For carrying out the measurement for example, the zero point of the graduations of one arm 6 of the setsquare is set to the starting point O of the outline K of the area and is caused to travel round the outline in any direction. The hand rests lightly on the drawing head 5 in order to cause the wheel 12 to move. The result is read off in a known manner from the counting disc 14 and the divisions of the wheel 12. The area of the surface is obtained from the difference between the values read off before and after travelling round the curve K and after multiplying it with the constant. When the measurement is ended the pin 16 is lifted from the catch by means of the knob 19 and the measuring device is turned upwards through an angle of α, so as to be put out of operation in order not to interfere with further work on the drawing. If desired, the measuring device may be moved along the arm 2 towards the ring 4 and brought into the operative position at this point. Care must of course be taken that the wheel 12 always runs on the drawing surface 20. The setsquare 6 is preferably made of transparent material in order to make it possible to travel round the outline K of the area in either direction.

In Fig. 1 the first graduation on the horizontal scale of the drawing head or setsquare is shown as used for the tracing point for measuring areas but since the head 5 and any member attached to it moves parallel to its original position, it is obvious that any point on head 5 or any point on any member attached to head 5 may be taken as the tracing point.

The invention is not restricted to this constructional example. The measuring device may be connected with both parts 2, 2' by means of a coupling rod which, of course, would have to be pivoted in such a manner as not to interfere with the parallel guiding. The measuring device can be resiliently arranged on the arm 2 in order to keep the presure of the wheel 12 on the drawing surface 20 as nearly as possible constant and in this way save the wheel 12. Instead of the catch illustrated, any other may be used. Other constructions of the measuring device or of the drawing instrument also fall within the scope of the invention in so far as these parts can be combined in a similar manner with useful results.

What I claim is:

1. In an instrument of the type described adapted for use in connection with a plane surface, a support adapted for attachment in fixed relation to said surface, an intermediate member, a pair of parallel arms of equal length each pivotally attached at one end to said support and at the other end to said intermediate member, a link connecting member, a pair of parallel links of equal length each pivotally attached at one end to said intermediate member, said link connecting member including tracing means adapted to be guided around the periphery of an area to be measured, and a planimeter running wheel supported by one of said links in position to operate upon said surface.

2. In an instrument of the type described adapted for use in connection with a plane surface, a support adapted for attachment in fixed relation to said surface, an intermediate member, a pair of arms each pivotally attached at one end to said support and at the other end to said intermediate member, a link connecting member, a pair of links each pivotally attached at one end to said intermediate member and at the other end to said link connecting member, and a planimeter running wheel supported by one of said links in position to operate upon said surface, the means for supporting said planimeter running wheel upon one of said links comprising a frame formed with bearings for said wheel and with means for attaching said frame to the supporting link at different distances from the intermediate member.

3. In an instrument of the type described adapted for use in connection with a plane surface, a support adapted for attachment in fixed relation to said surface, an intermediate member, a pair of arms each pivotally attached at one end to said support and at the other end to said intermediate member, a connecting member, a pair of links each pivotally attached at one end to said intermediate member and at the other end to said connecting member, said link connecting member including tracing means adapted to be guided around the periphery of an area to be measured, and a planimeter running wheel supported by one of said links in position to operate upon said surface.

4. In an instrument of the type described adapted for use in connection with a plane surface, a support adapted for attachment in fixed relation to said surface, an intermediate member, a pair of arms each pivotally attached at one end to said support and at the other end to said intermediate member, a connecting member, a pair of links each pivotally attached at one end to said intermediate member and at the other end to said connecting member, and a planimeter running wheel supported by one of said links in position to operate upon said surface, the means for supporting said planimeter running wheel upon one of said links comprising a frame formed with bearings for said wheel and with means for pivotally attaching said frame to the supporting link so that the running wheel may be moved away from said surface when not in use.

5. In an instrument of the type described adapted for use in connection with a plane surface, a support adapted for attachment in fixed relation to said surface, an intermediate member, a pair of arms each pivotally attached at one end to said support and at the other end to said intermediate member, a connecting member, a pair of links each pivotally attached at one end to said intermediate member and at the other end to said connecting member, and a planimeter running wheel supported by one of said links in position to operate upon said surface, the means for supporting said planimeter running wheel upon one of said links comprising a frame formed with bearings for said wheel and with clamping means so constructed and arranged that the frame may be held in various positions of adjustment relative to said surface and relative to said intermediate member.

6. In an instrument of the type described adapted for use in connection with a plane surface, a support adapted for attachment in fixed relation to said surface, an intermediate member, a pair of arms each pivotally attached at one end to said support and at the other end to said intermediate member, a connecting member, a pair of links each pivotally attached at one end to said intermediate member and at the other end to said connecting member, and a planimeter running wheel supported by one of said links in position to operate upon said surface, the means for supporting said planimeter wheel upon one of said links comprising a frame formed with bearings for said wheel and formed with a passage through which said supporting link passes.

7. In an instrument of the type described adapted for use in connection with a plane surface, a support adapted for attachment in fixed relation to said surface, an intermediate member, a pair of arms each pivotally attached at one end to said support and at the other end to said intermediate member, a connecting member, a pair of links each pivotally attached at one end to said intermediate member and at the other end to said connecting member, and a planimeter running wheel supported by one of said links in position to operate upon said surface, the means for supporting said planimeter wheel upon one of said links comprising a frame formed with bearings for said wheel and formed with means for pivotally and slidably attaching said frame to said supporting link.

8. In an instrument of the type described adapted for use in connection with a plane surface, a support adapted for attachment in fixed relation to said surface, an intermediate member, a pair of arms each pivotally attached at one end to said intermediate member, a link pivotally attached at one end to said intermediate member, and a planimeter running wheel supported upon said link in position to operate upon said surface, the means for supporting said planimeter running wheel from said link comprising a frame formed with bearings for said wheel and with means for pivotally attaching said frame to the supporting link so that the running wheel may be moved away from said surface when not in use.

9. In an instrument of the type described adapted for use in connection with a plane surface, a support adapted for attachment in fixed relation to said surface, an intermediate member, a pair of arms each pivotally attached at one end to said support and at the other end to said intermediate member, a link pivotally attached at one end to said intermediate member, a planimeter running wheel supported upon said link in position to operate upon said surface, and tracing point means adapted to be guided around the periphery of an area to be measured by said planimeter carried by the said link.

KARL RABE.